(12) United States Patent
Laing et al.

(10) Patent No.: US 7,364,662 B2
(45) Date of Patent: Apr. 29, 2008

(54) SCRAPER ADJUSTMENT MECHANISM AND METHOD

(76) Inventors: David A. Laing, 217 Northfield Dr., Elyria, OH (US) 44035; James Benenson, Jr., 1 Lexington Ave., New York, NY (US) 10010

( * ) Notice: Subject to any disclaimer, the term of this patent is extended or adjusted under 35 U.S.C. 154(b) by 32 days.

(21) Appl. No.: 11/556,852

(22) Filed: Nov. 6, 2006

(65) Prior Publication Data

US 2007/0114190 A1   May 24, 2007

Related U.S. Application Data

(60) Provisional application No. 60/739,054, filed on Nov. 22, 2005.

(51) Int. Cl.
   *B01D 33/46* (2006.01)
(52) U.S. Cl. .............. 210/791; 210/232; 210/396
(58) Field of Classification Search ............ None
   See application file for complete search history.

(56) References Cited

U.S. PATENT DOCUMENTS

| | | | |
|---|---|---|---|
| 148,557 A | 3/1874 | Gillespie et al. | |
| 556,725 A | 3/1896 | Farwell | |
| 740,574 A | 10/1903 | Kohlmeyer | |
| 793,720 A | 7/1905 | Godbe | |
| 1,757,153 A * | 5/1930 | Thompson | 210/357 |
| 2,084,955 A * | 6/1937 | Haught | 210/106 |
| 2,243,559 A * | 5/1941 | Griffith | 210/327 |
| 2,305,351 A * | 12/1942 | Hellan | 210/310 |
| 2,354,752 A * | 8/1944 | Hellan | 210/329 |
| 2,669,360 A * | 2/1954 | Little | 210/396 |
| 3,278,038 A * | 10/1966 | Acker | 210/396 |
| 3,762,563 A * | 10/1973 | Petersen | 210/415 |
| 5,194,160 A * | 3/1993 | Simonelli et al. | 210/741 |
| 5,401,396 A * | 3/1995 | Lescovich et al. | 210/108 |
| 5,595,655 A * | 1/1997 | Steiner et al. | 210/391 |
| RE35,560 E * | 7/1997 | Simonelli et al. | 210/741 |
| 5,865,997 A * | 2/1999 | Isaacs | 210/232 |
| 6,177,022 B1 | 1/2001 | Benenson, Jr. et al. | |
| 6,227,380 B1 * | 5/2001 | Bacher et al. | 210/408 |
| 6,517,722 B1 | 2/2003 | Benenson, Jr. et al. | |
| 6,666,976 B2 * | 12/2003 | Benenson et al. | 210/784 |
| 6,676,834 B1 * | 1/2004 | Benenson et al. | 210/323.2 |
| 6,712,981 B2 * | 3/2004 | Benenson et al. | 210/785 |
| 6,821,444 B2 | 11/2004 | Benenson, Jr. et al. | |
| 6,861,004 B2 * | 3/2005 | Benenson et al. | 210/785 |
| 7,258,788 B2 * | 8/2007 | Pollock | 210/221.2 |
| 2005/0199555 A1* | 9/2005 | Pollock | 210/703 |
| 2007/0114190 A1* | 5/2007 | Laing et al. | 210/791 |
| 2007/0289912 A1* | 12/2007 | Pollock | 210/197 |

* cited by examiner

*Primary Examiner*—Robert James Popovics
(74) *Attorney, Agent, or Firm*—Caesar, Rivise, Bernstein, Cohen & Pokotilow, Ltd.

(57) ABSTRACT

A scraper adjustment mechanism and method for a filter that permits an operator to adjust the distance between the scraper and a filter surface without the need to have access to the filter/scraper interface, or fasteners within the filter.

20 Claims, 4 Drawing Sheets

SCRAPER ADJUSTMENT MECHANISM AND METHOD

CROSS-REFERENCE TO RELATED APPLICATIONS

This utility application claims the benefit under 35 U.S.C. §119(e) of Provisional Application Ser. No. 60/739,054 filed on Nov. 22, 2005 entitled SCRAPER ADJUSTMENT MECHANISM AND METHOD and whose entire disclosure is incorporated by reference herein.

BACKGROUND OF THE INVENTION

1. Field of Invention

This invention relates generally to filter devices and, more particularly, to filters using scrapers or similar devices for removing particulates from a filter surface.

2. Description of Related Art

It is well-known that the mechanical cleaning of a filter surface can be accomplished by having a brush or scraper drag along the filter surface where deposits have accumulated. In certain configurations, the brush or scraper is mounted at one end between two walls but with a significant portion of the brush or scraper projecting beyond the walls. Such configurations are shown in U.S. Pat. Nos. 148,557 (Gillespie et al.); 556,725 (Farwell); 740,574 (Kohlmeyer) and 793,720 (Godbe). In conventional filter systems, the particulate contaminants are driven off the filter surface and are deposited in a hopper or tank along with some of the fluid being filtered.

Scraper edges are prone to wear over time and therefore it is necessary to periodically adjust the relative position of the scraper edge with the filter surface. In some cases, it desirable to make such adjustments without compromising or breaking the pressure boundary in the system being filtered by opening a hatch or access panel to reach the filter. This may become more complicated where such scrapers are used with filter assemblies for cleaning fuel oil in ships (see for example, U.S. Pat. Nos. 6,177,022 (Benenson, Jr. et al.); 6,517,722 (Benenson, Jr. et al.); 6,821,444 (Benenson, Jr., et al.)) because the fuel oil system is a critical system and as such the filter assemblies therein cannot be removed from service or otherwise opened for scraper adjustment. Moreover, this scraper adjustment needs to be accomplished without fasteners within, or access to, the filter assembly itself.

Thus, there remains a need for periodically adjusting the scraper position in a filter assembly without the need to have access to the scraper/filter interface, without having to depressurize the filter assembly and avoiding the use of any components that can dislodge and foul the filter system.

All references cited herein are incorporated herein by reference in their entireties.

BRIEF SUMMARY OF THE INVENTION

A scraper adjustment mechanism for adjusting the distance between an edge of a scraper and a filter assembly surface positioned in a filter assembly housing and wherein the housing includes an inspection port. The scraper adjustment mechanism comprises: an inspection cover comprising a projection that passes through the inspection port when the cover is installed at the inspection port. The projection comprises a recess in a first surface of the inspection cover and the inspection cover further includes a plurality of passageways from the first surface to a second opposite surface of the inspection cover; a scraper having a scraper edge and an upper portion, and wherein the upper portion is movable within the recess and wherein the upper portion comprises a first angled surface; a wedge portion that is movable within the recess and wherein the wedge portion comprises a second angled surface corresponding to the first angled surface, and wherein the first and second angled surfaces are in contact with each other such that when the wedge portion is displaced with respect to the upper portion, the portions are either tightened against each other or are permitted to move; a pair of elongated members (e.g., tie bars) having first and second ends, wherein the first ends are fixedly secured within the wedge portion and the upper portion, respectively, wherein the second ends are passed through respective ones of the plurality of passageways and wherein the second ends protrude from the second opposite surface and can be rotated for adjusting the distance between the edge of the scraper and the filter assembly surface to a desired position.

A method of adjusting the distance between an edge of the scraper and a filter surface to be cleaned without having any visual access to the scraper edge and the filter surface, both of which are located inside a housing which includes an inspection port closed off by an inspection cover. The method comprises the steps of: providing an inspection cover having a projection, that is passed through the inspection port when installed, and wherein the projection includes a recess in a first surface and further includes a plurality of passageways from the first surface to a second opposite surface; fixedly securing one end of a first elongated member (e.g., tie bar) within a wedge element and fixedly securing one end of a second elongated member (e.g., tie bar) within an upper portion of the scraper, and wherein the upper portion and the wedge element comprise respective angled surfaces, and wherein the respective angled surfaces are in contact with each other; passing the other ends of the elongated members through respective ones of the plurality of passageways to protrude from the second opposite surface and inserting the wedge element and the upper portion of the scraper into the recess; securing the inspection cover at the inspection port; and displacing the other ends of the elongated members to adjust the distance between the edge of the scraper and the filter assembly surface to a desired position.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
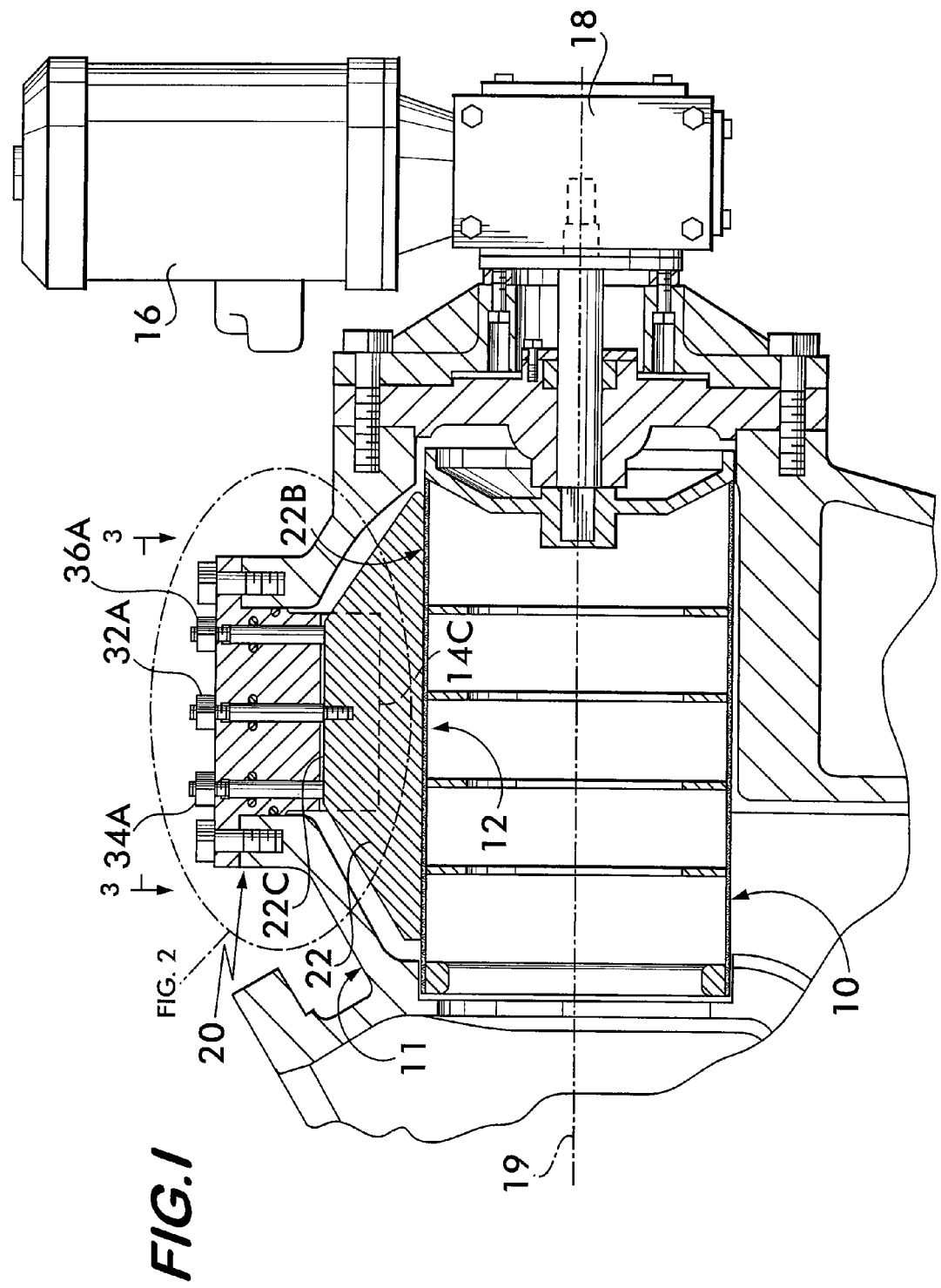
FIG. 1 is a side cross-sectional view of the filter assembly and the scraper adjustment mechanism of the present invention.

The scraper adjustment mechanism 20 (FIG. 1) permits the adjustment of the edge/blade 22B of a scraper 22 with respect to the outside surface 12 of a filter assembly 10. This mechanism 20 eliminates any fasteners within the filter assembly 10 that normally would have to be accessed in order to adjust the scraper 22 and provides the ability to adjust the scraper 22 without having to open an inspection cover 14.

As can be seen most clearly in FIG. 1, the filter assembly 10 is positioned in a fluid flow (not shown), e.g., a fuel oil flow, or a sea water flow used for various cooling operations, or any other type of fluid flow. The filter assembly 10 and the scraper 22 are not visible to an operator that needs to adjust the scraper 22 as they are internal to a filter assembly housing 11. Access can be gained to the filter assembly 10 and scraper through the inspection cover 14 at an inspection port. However, as mentioned earlier, the advantage of the present invention 20 is that the scraper 22 can be adjusted without the need to open the inspection cover 14 (or any other housing surface that surrounds the filter assembly 10 and scraper 22) or otherwise have any visual access to the filter assembly 10 and scraper 22. As used throughout this Specification, the term "housing surface" is meant to cover any construction, including inspection covers, that obscures the filter assembly 10 and scraper 22 from view so that adjustment of the scraper 22 is being accomplished by the operator essentially "blind."

With the scraper edge 22B adjacent the filter surface 12, a motor 16 activates a gear reducer 18 to rotate the screen about the filter assembly's longitudinal axis 19, thereby driving off any particulates from the filter surface 12. The impact of the particulates, among other factors, on the scraper edge 22B over time causes the edge to wear, thereby requiring that the scraper 22 be moved slightly closer to the filter surface 12. Currently, such scraper adjustments are achieved by removing the inspection cover 14 and manipulating fasteners in the filter assembly 10 to release the scraper and then move the scraper edge closer to the filter surface 12. The scraper is then secured in place and the inspection cover 14 re-installed. However, this process is time-consuming and is exposed to the risk that any of the fasteners in the filter assembly 10 can be lost and foul the fluid flow.

The present invention 20 avoids the need to remove the inspection cover 14. As can be seen most clearly in FIG. 4, the inspection cover 14 comprises a cylindrical projection 14A that projects through an inspection opening 2. A central recess 14B is formed at the bottom 14C of the inspection cover 14. Into this recess 14B are positioned a wedge portion or element 24 and the upper portion 22A of the scraper 22, the upper portion 22A being formed integrally with the lower portion of the scraper 22. The wedge portion or element 24 and the upper portion 22A comprise corresponding angled surfaces 26A/26B that can slide against each other, thereby providing an infinite adjustment operation. By way of example only, the angle α formed by these corresponding surfaces is approximately 7 degrees. As can be appreciated, if the wedge portion 24 is displaced downward, toward the filter surface 12, this relieves the sideways force against the upper portion 22A of the scraper 22, thereby allowing the upper portion 22A to be moved upward or downward (i.e., toward or away from) the filter surface 12 and thus positioning the scraper edge/blade 22B with respect to the filter surface 12 to a desired position. Conversely, if the wedge portion 24 is moved upward, i.e., away from, the filter surface 12, this increases the sideways pressure against the upper portion 22A, thereby locking the scraper 22, and the scraper edge 22B, in position. A small gap G shown in the recess 14B, allowing for some additional upward displacement of the wedge portion 24 and the upper portion 22A, is shown.

Figure 2:
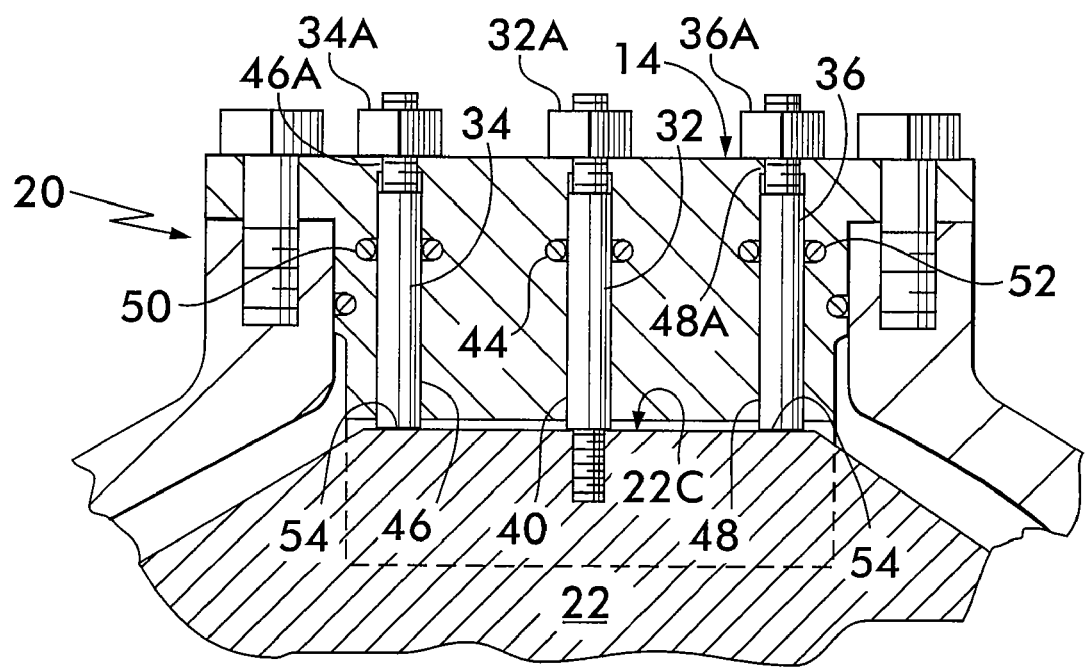
FIG. 2 is an enlarged cross-sectional view of the of the inspection cover and a portion of the scraper adjustment mechanism of the present invention as indicated in FIG. 1.
Figure 4:
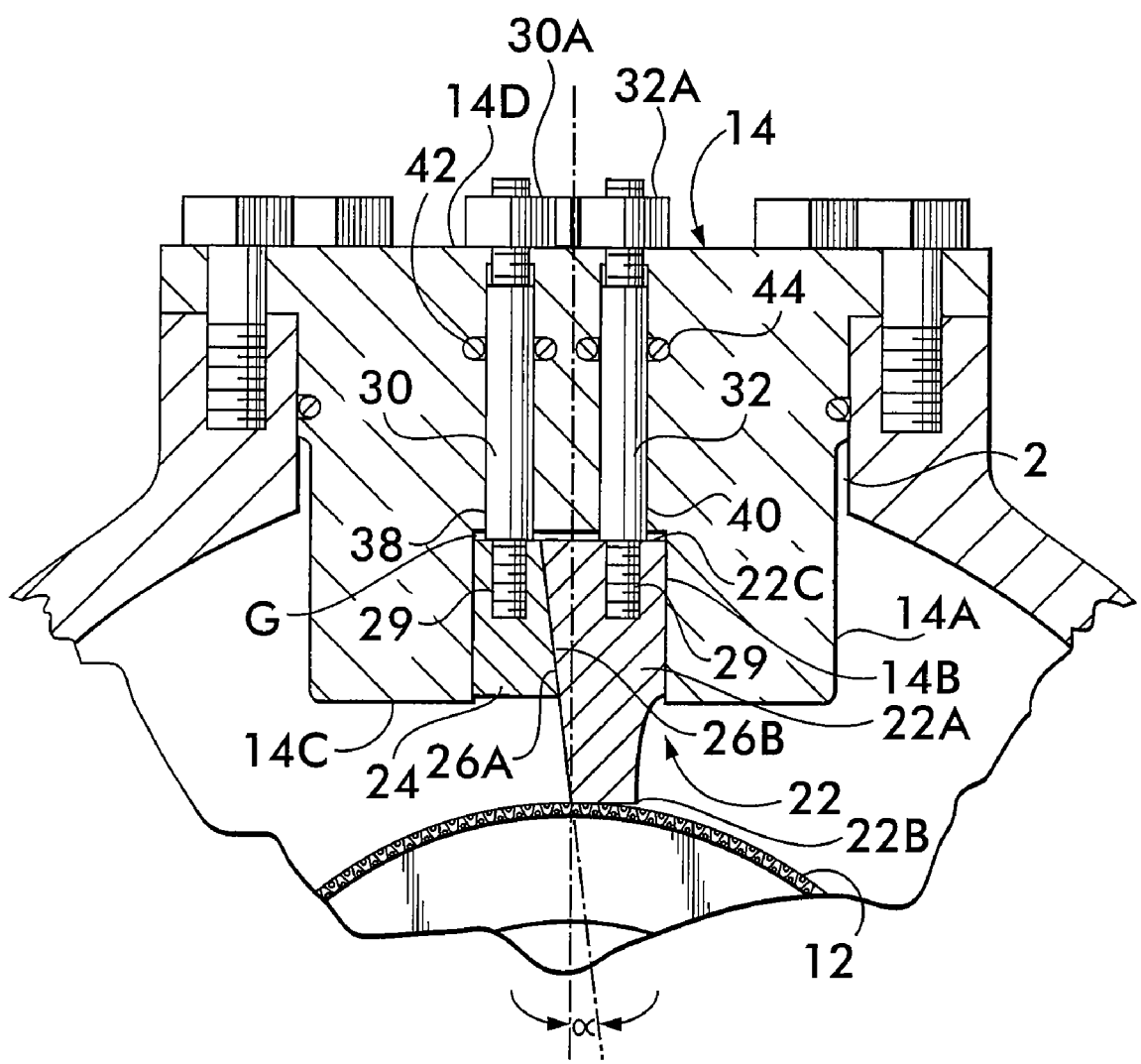
FIG. 4 is an enlarged cross-sectional view of the scraper adjustment mechanism of the present invention taken along line 4-4 of FIG. 3.

To releasably secure the scraper 22 in place, the scraper adjustment mechanism 20 further comprises elongated members (e.g., tie bars) 30 and 32 and jack screws 34 and 36 (FIG. 2), as well as respective jam nuts 30A-36A. As can be seen most clearly in FIG. 4, a first end of each tie bars 30/32 are fixedly secured within the wedge portion 24 and within the upper portion 22A of the scraper 22, respectively. Although this can be accomplished in a number of ways, by way of example only, FIG. 4 shows the use of a threaded engagement 29 accompanied by a locking compound (not shown); alternatively, a plug weld configuration can be used. The other second end of each tie bar 30/32 has a threaded portion (a portion of which protrudes beyond the top surface 14D of the inspection cover 14) onto which their respective jam nuts 30A and 32A are secured. Thus, once the first end of each tie bar 30/32 is fixedly secured to its respective wedge portion 24 and upper portion 22A, the second end of the tie bars 30/32 are passed through respective passageways 38 and 40 in the inspection cover 14. The respective jam nuts 30A and 32A are then engaged on the respective threaded second ends of the bars 30/32 against the top surface 14D of the inspection cover 14. To maintain the pressurized condition of the filter assembly, seals 42/44 are provided in the passageways 38/40.

To maintain the alignment of the scraper 22 so that it is parallel to the filter screen 12, jack screws 34 and 36 are provided to bear against the top surface 22C of the upper portion 22A of the scraper 22. In particular, as shown most clearly in FIG. 2, the jack screws 34 and 36 are disposed in respective passageways 46 and 48 in the inspection cover 14. Corresponding seals 50 and 52 are also provided to maintain the pressurized condition of the filter assembly. The first ends 54 of the jack screws 34 and 36 bear against the top surface 22C of the upper portion, as mentioned previously. The second ends of the jack screws 34 and 36 also have threaded ends (each of which has a portion that also protrudes beyond the top surface 14D of the inspection cover 14) onto which their respective jam nuts 34A and 36A are secured. It should be noted that the upper portion of each passageway 46 and 48 comprise respective threaded portions 46A and 48A. These portions cooperate with the threaded second ends to provide a controlled positioning of the jack screws 34 and 36. Thus rotation of these jack screws 34/36 provides an infinite adjustment of the upward or downward position of the first ends 54. Jam nuts 34A/36A lock the jack screws 34/36 from any further rotation.

Figure 3:
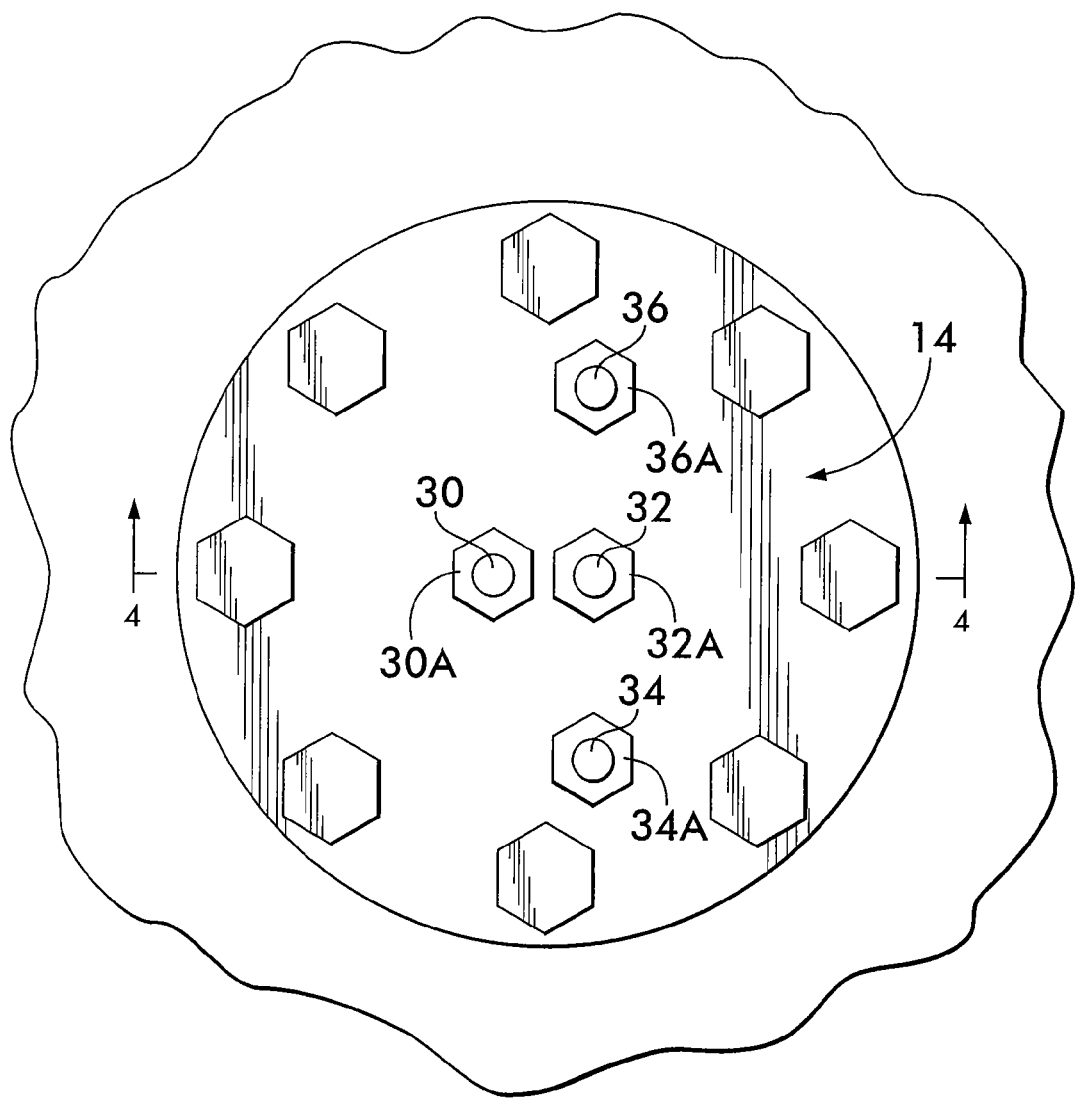
FIG. 3 is a top view of the inspection cover showing the jam nuts for the tie bolts and jack screws of the scraper adjustment mechanism of the present invention taken along line 3-3 of FIG. 1.

To adjust the scraper 22, the operator loosens all of the jam nuts 30A-36A (FIG. 3). The operator then slightly displaces the tie bar 30 inward (FIG. 4), towards the filter assembly 10. This action relaxes the sideways force against the upper portion 22A of the scraper 22, thereby freeing the upper portion 22A of the scraper 22 to be moved. The operator then displaces the tie bar 32 inward, towards the filter assembly 10. As soon as he/she feels the scraper edge/blade 22B making contact with the filter surface 12, the scraper edge/blade 22B can then be re-positioned. First, the operator rotates each of the jack screws 34/34 (FIG. 2) an equal amount to properly position their ends 54 so that when the top edge of the scraper 22 contacts these ends 54, the scraper edge/blade 22B will be located approximately 0.005-0.010 inches from the filter surface 12. To achieve this, the operator pulls the tie bar 32 outward, away from the filter surface 12 until the top surface 22C of the scraper 22 contacts the jack screw ends 54. When this occurs, the operator then pulls the tie bar 30 outward, away from the filter assembly 10 which causes the wedge portion 24 to lock the upper portion 22A, and thus the scraper edge/blade 22B, in place at the desired distance from the filter surface 12. The respective jam nuts 30A and 32A are then tightened against the top surface 14D of the inspection cover 14. Next, the jam nuts 34A and 36A are then tightened against the top of surface 14D. Because the tie bar 30 acts as the locking device for the scraper adjustment mechanism 20, the jam nut 30A has a minimum torque level that must be achieved when completing the adjustment.

It should be understood that rotation of the jack screws 34 and 36 is well-defined such that the operator can translate the angular amount of screw rotation (e.g., 1/10 of a turn, or a second amount of degrees, etc.) for corresponding determining the position of the top edge of the scraper 22.

It should also be understood that although the environment for use of the scraper mechanism of the present invention 20 is described for use in a military application, the present invention 20 can be used in commercial applications for commercial filters/strainers in a variety of sizes. Thus, the application of the present invention 20 is not, in any way, limited to the application described herein.

Where the present invention is used in harsh water environments (e.g., sea water), the scraper adjustment mechanism 20 components (e.g., the wedge portion, scraper, tie bolts, jack bolts, etc.) may comprise a nickel/copper alloy material, e.g., Monel® metal. The inspection cover may comprise an aluminum/bronze material.

It should also be understood that the terms "upper", "upward" and "downward," "top," "sideways", are by way of example only and that depending in the particular orientation of the scraper 22 and filter assembly 10, the scraper adjustment mechanism 20 operates in the same manner and is not limited to the orientation depicted in the figures.

While the invention has been described in detail and with reference to specific examples thereof, it will be apparent to one skilled in the art that various changes and modifications can be made therein without departing from the spirit and scope thereof.

What is claimed is:

1. A scraper adjustment mechanism for adjusting the distance between an edge of a scraper and a filter assembly surface positioned in a filter assembly housing and wherein the housing includes an inspection port, said scraper adjustment mechanism comprising:
    an inspection cover comprising a projection that passes through the inspection port when said cover is installed at said inspection port, said projection comprising a recess in a first surface of said inspection cover, said inspection cover further including a plurality of passageways from said first surface to a second opposite surface of said inspection cover;
    a scraper having a scraper edge and an upper portion, said upper portion being movable within said recess and said upper portion comprising a first angled surface;
    a wedge portion that is movable within said recess and said wedge portion comprising a second angled surface corresponding to said first angled surface, said first and second angled surfaces being in contact with each other such that when said wedge portion is displaced with respect to said upper portion said portions are either tightened against each other or are permitted to move;
    a pair of elongated members having first and second ends, said first ends being fixedly secured within said wedge portion and said upper portion, respectively, said second ends being passed through respective ones of said plurality of passageways and wherein said second ends protrude from said second opposite surface and can be rotated for adjusting the distance between the edge of the scraper and the filter assembly surface to a desired position.

2. The scraper adjustment mechanism of claim 1 wherein said second ends of said elongated members are threaded for receiving respective nuts thereon, said nuts being rotatable for securing said elongated members against said second opposite surface.

3. The scraper adjustment mechanism of claim 1 wherein said scraper comprises a pair of jack screws having third and fourth ends, said third ends being in contact with an upper surface of the scraper, said fourth ends comprising threads and being passed through respective ones of said plurality of passageways, said threads of said fourth ends cooperating with threaded portions of said respective ones of said plurality of passageways for positioning said third ends.

4. The scraper adjustment mechanism of claim 3 wherein said jack screws comprise a nickel/copper alloy material.

5. The scraper adjustment mechanism of claim 1 wherein said projection is a cylindrical projection.

6. The scraper adjustment mechanism of claim 1 wherein said scraper edge and said upper portion are integrally formed.

7. The scraper adjustment mechanism of claim 1 wherein each one of said plurality of passageways comprises a seal.

8. The scraper adjustment mechanism of claim 1 wherein said first ends are plug welded within said wedge portion and said upper portion.

9. The scraper adjustment mechanism of claim 1 wherein said first ends are threaded within said wedge portion and said upper portion and secured with a locking compound.

10. The scraper adjustment mechanism of claim 1 wherein said wedge portion comprises a nickel/copper alloy material.

11. The scraper adjustment mechanism of claim 1 wherein said elongated members comprise a nickel/copper alloy material.

12. The scraper adjustment mechanism of claim 1 wherein said first angled surface and said second angled surface comprise an angle of approximately 7 degrees with respect to a vertical reference.

13. A method of adjusting the distance between an edge of the scraper and a filter surface to be cleaned without having any visual access to the scraper edge and the filter surface, both of which are located inside a housing which includes an inspection port closed off by an inspection cover, said method comprising the steps of:
    providing an inspection cover having a projection, that is passed through the inspection port when installed, and wherein said projection includes a recess in a first surface and further includes a plurality of passageways from said first surface to a second opposite surface;
    fixedly securing one end of a first elongated member within a wedge element and fixedly securing one end of a second elongated member within an upper portion of said scraper, and wherein said upper portion and said wedge element comprise respective angled surfaces, said respective angled surfaces being in contact with each other;
    passing the other ends of said elongated members through respective ones of said plurality of passageways to protrude from said second opposite surface and inserting said wedge element and said upper portion of said scraper into said recess;
    securing said inspection cover at said inspection port; and
    displacing said other ends of said elongated members to adjust the distance between the scraper edge and the filter assembly surface to a desired position.

14. The method of claim 13 wherein said step of displacing said other ends comprises:
- displacing said first elongated member in a first direction to displace said wedge element towards said filter surface, thereby releasing said upper portion of said scraper for movement;
- displacing said second elongated member to move the edge of said scraper to a desired position away from said filter surface; and
- displacing said first elongated in a second direction, opposite to said first direction, to lock said scraper edge at said desired position.

15. The method of claim 13 wherein said step of passing the other ends of said elongated members through respective ones of said plurality of passageways further comprises:
- passing jack screws through respective passageways in said inspection cover, said jack screws having respective ends that bear against an upper surface of said scraper for maintaining the edge of said scraper at said desired position and that comprise upper ends that protrude from said second opposite surface;
- providing said respective passageways and said upper ends with cooperating threads for controlling the positioning of said respective ends by rotating said jack screws.

16. The method of claim 15 wherein said step of displacing said other ends comprises:
- displacing said first elongated member in a first direction to displace said wedge element towards said filter surface, thereby releasing said upper portion of said scraper for movement;
- rotating said jack screws to position said respective ends at a desired location;
- displacing said second elongated member in said first direction to contact said scraper with the filter surface;
- displacing said second elongated member in a second direction, opposite to said first direction, until said upper surface of said scraper contacts said respective ends;
- displacing said first elongated member in said second direction to lock said scraper edge at said desired position.

17. The method of claim 16 further comprising:
- providing a respective nut for each of said elongated members and said jack screws; and
- tightening each of said nuts.

18. The method of claim 13 including the step of providing a seal in each of one of said plurality of passageways.

19. The method of claim 15 including the step of providing a seal in each of said passageways containing a jack screw.

20. The method of claim 13 wherein said respective angled surfaces comprise an angle of approximately 7 degrees with respect to a vertical reference.

* * * * *